US009240075B2

(12) United States Patent
Mullins

(10) Patent No.: US 9,240,075 B2
(45) Date of Patent: Jan. 19, 2016

(54) CAMPAIGN OPTIMIZATION FOR EXPERIENCE CONTENT DATASET

(71) Applicant: DAQRI, LLC, Los Angeles, CA (US)

(72) Inventor: Brian Mullins, Garden Grove, CA (US)

(73) Assignee: DAQRI, LLC, Los Angeles, CA (US)

( * ) Notice: Subject to any disclaimer, the term of this patent is extended or adjusted under 35 U.S.C. 154(b) by 293 days.

(21) Appl. No.: 13/839,968

(22) Filed: Mar. 15, 2013

(65) Prior Publication Data

US 2014/0267405 A1 Sep. 18, 2014

(51) Int. Cl.
*G06T 19/00* (2011.01)
*G06Q 30/02* (2012.01)

(52) U.S. Cl.
CPC .............. *G06T 19/006* (2013.01); *G06Q 30/02* (2013.01)

(58) Field of Classification Search
None
See application file for complete search history.

(56) References Cited

U.S. PATENT DOCUMENTS

| 2011/0219339 A1* | 9/2011 | Densham ...................... 715/849 |
| 2011/0316845 A1 | 12/2011 | Roberts et al. |
| 2012/0327119 A1* | 12/2012 | Woo et al. ...................... 345/633 |
| 2013/0179783 A1* | 7/2013 | Woods et al. ................... 715/716 |
| 2013/0335303 A1* | 12/2013 | Maciocci et al. ................. 345/8 |
| 2013/0342570 A1* | 12/2013 | Kinnebrew et al. ............. 345/633 |

FOREIGN PATENT DOCUMENTS

| KR | 101126449 B1 | 3/2012 |
| KR | 1020120025881 A | 3/2012 |
| WO | WO-2014150995 A1 | 9/2014 |

OTHER PUBLICATIONS

"International Application Serial No. PCT/US2014/024728, International Search Report mailed Sep. 2, 2014", 3 pgs.
"International Application Serial No. PCT/US2014/024728, Written Opinion mailed Sep. 2, 2014", 5 pgs.
International Application Serial No. PCT/US2014/024728, International Preliminary Report on Patentability mailed Sep. 24, 2015, 7 pgs.

* cited by examiner

*Primary Examiner* — Maurice L McDowell, Jr.
*Assistant Examiner* — Donna J Ricks
(74) *Attorney, Agent, or Firm* — Schwegman Lundberg & Woessner, P.A.

(57) ABSTRACT

A server for campaign optimization is described. An experience content dataset is generated for an augmented reality application of a device based on analytics results. The analytics results are generated based on analytics data received from the device. The experience content dataset is provided to the device. The device recognizes a content identifier of the experience content dataset and generates an interactive experience with a presentation of virtual object content that is associated with the content identifier.

20 Claims, 10 Drawing Sheets

CAMPAIGN OPTIMIZATION FOR EXPERIENCE CONTENT DATASET

TECHNICAL FIELD

The subject matter disclosed herein generally relates to the processing of data. Specifically, the present disclosure addresses systems and methods for a campaign optimization for experience content dataset.

BACKGROUND

A device can be used to generate additional data based on an image captured with the device. For example, augmented reality (AR) is a live, direct or indirect, view of a physical, real-world environment whose elements are augmented by computer-generated sensory input such as sound, video, graphics or GPS data. With the help of advanced AR technology (e.g. adding computer vision and object recognition) the information about the surrounding real world of the user becomes interactive. Artificial information about the environment and its objects can be overlaid on the real world.

BRIEF DESCRIPTION OF THE DRAWINGS

Some embodiments are illustrated by way of example and not limitation in the figures of the accompanying drawings.

DETAILED DESCRIPTION

Figure 1:
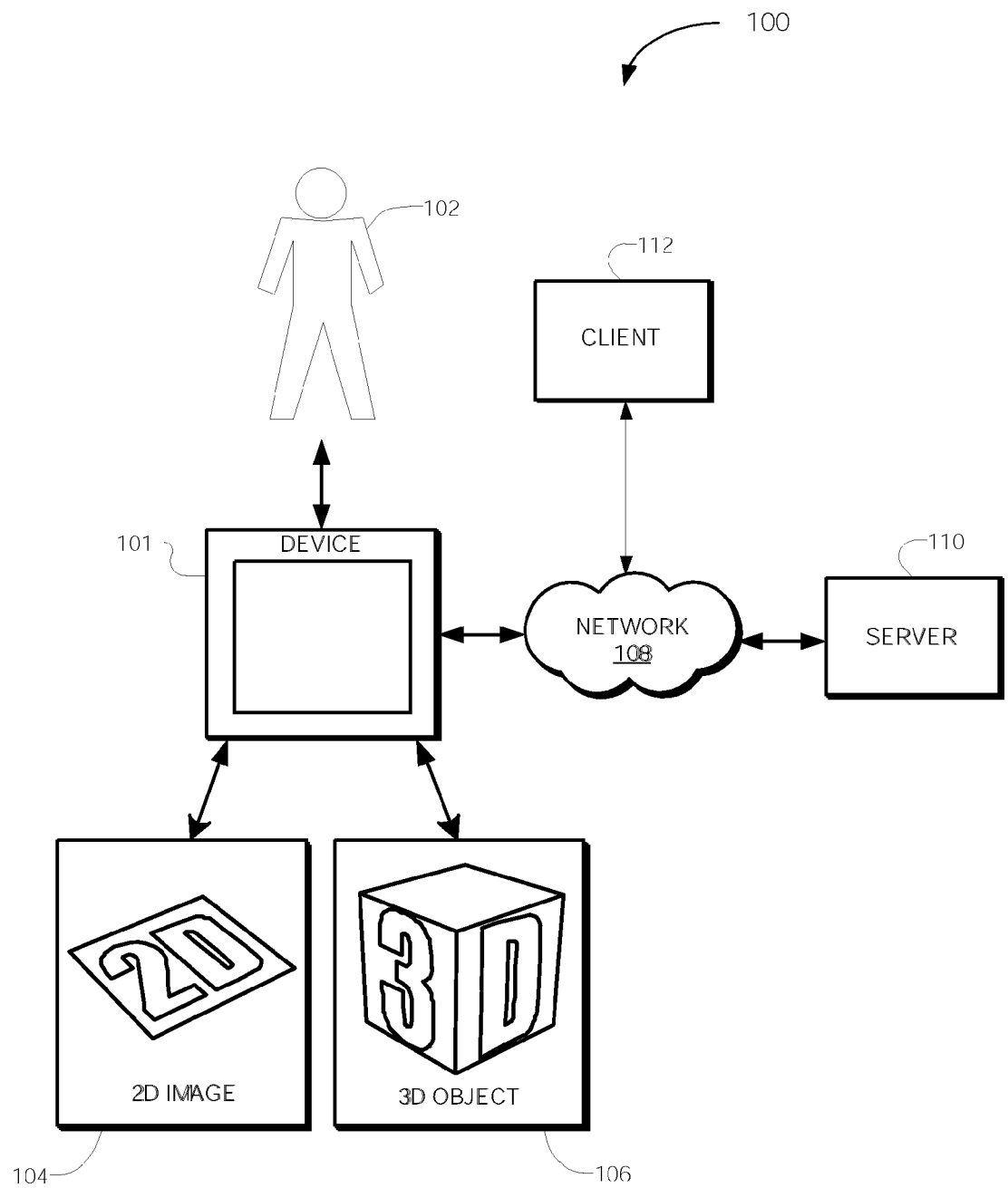
FIG. 1 is a block diagram illustrating an example of a network suitable for operating a campaign optimizer, according to some example embodiments.

Example methods and systems are directed to a campaign optimization for experience content dataset. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A server for campaign optimization is described. An experience content dataset is generated for an augmented reality application of a device based on analytics results. The analytics results are generated based on analytics data received from the device. The experience content dataset is provided to the device. The device recognizes a content identifier of the experience content dataset and generates an interactive experience with a presentation of virtual object content that is associated with the content identifier.

Augmented reality applications allow a user to experience additional information, such as in the form of a three-dimensional virtual object overlaid on a picture of a physical object captured by a camera of a device. The physical object may include a visual reference (also referred to as a content identifier) that the augmented reality application can identify and recognize. A visualization of the additional information, such as the three-dimensional virtual object engaged with an image of the physical object is generated in a display of the device. The three-dimensional virtual object may be based on the recognized visual reference. A rendering of the visualization of the three-dimensional virtual object may be based on a position of the display relative to the visual reference.

The server may access analytics results for the device. In one embodiment, the server builds a new experience content dataset for the experience content dataset based on the analytics results for the device. In another embodiment, the server modifies an original experience content dataset into the experience content dataset based on the analytics results for the device.

The server may generate a virtual object model using the experience content dataset. The virtual object model may be rendered in a display of the device based on a position of the device relative to a physical object recognized as the content identifier. A presentation of the virtual object may be based on a real-time image of the physical object captured with the device. The virtual object model may be associated with an image of the physical object.

In one embodiment, the server may receive pose estimation data of the device relative to the physical object captured with the device, pose duration data of the device relative to the physical object captured with the device, pose orientation data of the device relative to the physical object captured with the device, and pose interaction data of the device relative to the physical object captured with the device. Pose estimation data may include a location on the physical or virtual object aimed by the device. Pose duration data may include a time duration within which the device is aimed at a same location on the physical or virtual object. Pose orientation data may include an orientation of the device aimed at the physical or virtual object. Pose interaction data may include interactions of the user on the device with respect the virtual object corresponding to the physical object.

In one embodiment, the content identifier may include a two-dimensional image or a three-dimensional object model. The virtual object content may include a two-dimensional or three-dimensional virtual object model. The experience generator may associate the content identifier with the virtual object content to generate the experience content dataset.

In one embodiment, the two-dimensional or three-dimensional virtual object model has at least one interactive feature that changes a state of the two-dimensional or three-dimensional virtual object model in response to an interaction from a user on the device. The server may change an interactive feature of the virtual object content from the experience content dataset based on the analytics results.

In one embodiment, the analytics data may include usage conditions of the device, the usage conditions of the device comprising social information of a user of the device, location usage information, and time information of the device using the augmented reality application.

In another embodiment, the server may also generate analytics results based on analytics data received from the device. The analytics results may be provided to the campaign optimization module to generate an enhanced experience content dataset based on the analytics results. For example, the experience at the device may be customized based on the user device usage history, which picture and which part of the picture the user used the device to point at, a length time corresponding to the part of the picture the device was pointed at, and so forth.

FIG. 1 is a network diagram illustrating a network environment 100 suitable for operating an augmented reality application of a device, according to some example embodiments. The network environment 100 includes a device 101, a client 112, and a server 110, communicatively coupled to each other via a network 108. The device 101, the client 112, and the server 110 may each be implemented in a computer system, in whole or in part, as described below with respect to FIG. 12.

The server 110 may be part of a network-based system. For example, the network-based system may be or includes a cloud-based server system that provides campaign optimization for an experience content dataset. The client 112 may access the campaign optimization module in the server 110 via a web-browser or a programmatic client to target specific audiences or users.

A user 102 may use the device 101 to experience an interactive content generated by the experience content dataset generated by the server 110. In another example, the user 102 may use the client 112 to use the content creation tool of the server 110 to generate the interactive content on the device 101. The user may be a human user (e.g., a human being), a machine user (e.g., a computer configured by a software program to interact with the device 101), or any suitable combination thereof (e.g., a human assisted by a machine or a machine supervised by a human). The user 102 is not part of the network environment 100, but is associated with the device 101 and may be a user of the device 101. For example, the device 101 may be a desktop computer, a vehicle computer, a tablet computer, a navigational device, a portable media device, or a smart phone belonging to the user 102.

The user 102 may be a user of an application in the device 101. The application may include an augmented reality application configured to provide the user 102 with an experience triggered with a physical object such as, a two-dimensional physical object 104 (e.g., a picture) or a three-dimensional physical object 106 (e.g., a car). For example, the user 102 may point a lens of the device 101 to capture an image of the two-dimensional physical object 104. The image is recognized locally in the device 101 using a local context recognition dataset module of the augmented reality application of the device 101. The augmented reality application then generates additional information (e.g., an interactive three-dimensional model) in a display of the device 101 in response to identifying the recognized image. If the capture image is not recognized locally at the device 101, the device 101 downloads the three-dimensional model corresponding to the captured image, from a database of the server 110 over the network 108.

The device 101 may capture and submit analytics data to the server 110 for further analysis on usage and how the user 102 is engaged with the physical object. For example, the analytics data may include where in particular on the physical or virtual object the user 102 has looked at, how long the user 102 has looked at each location on the physical or virtual object, how the user 102 held the device 101 when looking at the physical or virtual object, which features of the virtual object the user 102 interacted with (e.g., such as whether a user tapped on a link in the virtual object). The analytics data may be processed at the server 110 to generate an enhanced content dataset or modified content dataset based on an analysis of the analytics data. The device 101 may receive and generate a virtual object with additional or enhanced features or a new experience based on the enhanced content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
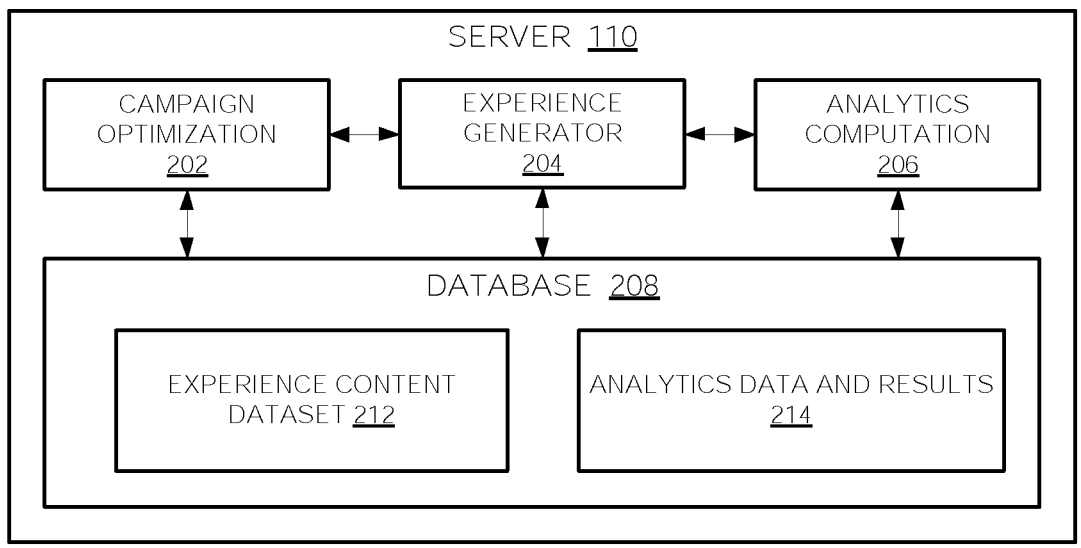
FIG. 2 is a block diagram illustrating modules (e.g., components) of a server, according to some example embodiments.

FIG. 2 is a block diagram illustrating modules (e.g., components) of a server, according to some example embodiments. The server 110 includes a campaign optimization module 202, an experience generator 204, an analytics computation module 206, and a database 208 in a storage device.

The campaign optimization module 202 may generate an experience content dataset for an augmented reality application of the device 101 based on analytics results (from the device or other devices). The campaign optimization module 202 is described in more details below with respect to FIG. 3.

The experience generator 204 may provide the experience content dataset to the device 101 that recognizes the content identifier, and generate an interactive experience with the virtual object content at the device 101. In one embodiment, the experience generator 204 generate a virtual object model using the experience content dataset to be rendered in a display of the device 101 based on a position of the device 101 relative to a physical object such as the two-dimensional physical object 104 (e.g., a picture) or the three-dimensional physical object 106 (e.g., a car). The device 101 recognizes the two-dimensional physical object 104 (e.g., a picture) or the three-dimensional physical object 106 (e.g., a car) as a content identifier. The visualization of the virtual object may correspond to the virtual object model engaged with a real-time image of the physical object captured with the device 101. The virtual object model may be based on an image of the physical object.

The analytics computation module 206 may operate on analytics data received from the device or other devices to generate analytics results, and to provide the analytics results to the campaign optimization module 202 so that the campaign optimization module 202 can generate a new or modified experience content dataset based on the analytics results. For example, an additional animation or feature may be provided and associated with a location most often viewed by the user. In another example, personalized information may be provided in a presentation of the virtual content (virtual billboard) with scores or statistics of the user's favorite teams.

In one embodiment, the analytics computation module 206 analyzes a pose estimation of the device 101 relative to the physical object captured with the device 101, a pose duration of the device 101 relative to the physical object captured with the device 101, a pose orientation of the device relative to the physical object captured with the device 101, and a pose interaction of the device relative to the physical object captured with the device 101. The pose estimation may include a location on the physical or virtual object aimed by the device. The pose duration may include a time duration within which the device is aimed at a same location on the physical or virtual object. The pose orientation may include an orientation of the device aimed at the physical or virtual object. The pose interaction may include interactions of the user on the device with respect the virtual object corresponding to the physical object.

The database 208 may include experience content dataset 212, and analytics and results data 214.

The experience content dataset 212 may include datasets generated based on content creation template data using a content creation tool. For example, the datasets may include a table of interactive virtual contents and corresponding physical contents.

The analytics and results data 214 may include analytics data received from devices. For example, the analytics data may include pose estimation data, pose duration data, pose orientation data, pose interaction data, sentiment data, among others. The analytics and results data 214 may include results data from an analysis of the analytics data with the analytics computation module 206. Results data may include most often used features or most often looked at location of a virtual content generated from one of the experience content dataset 212.

Figure 3:
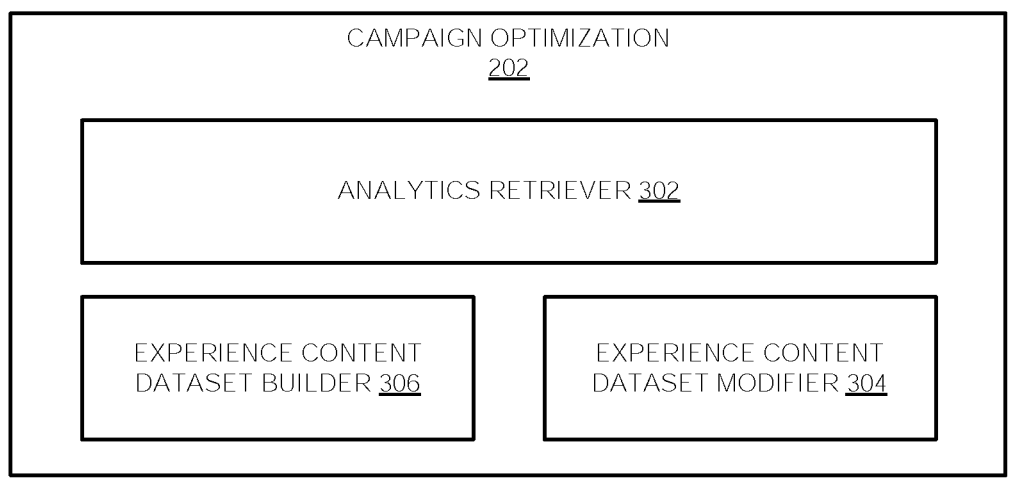
FIG. 3 is a block diagram illustrating modules (e.g., components) of a campaign optimizer, according to some example embodiments.

FIG. 3 is a block diagram illustrating modules (e.g., components) of the campaign optimization module 202, according to some example embodiments. The campaign optimization module 202 includes an analytics retriever 302, an experience content dataset builder 306, and an experience content dataset modifier 304.

In one embodiment, the analytics retriever 302 accesses analytics results for the device 101. The experience content dataset builder 306 builds a new experience content dataset for the experience content dataset based on the analytics results for the device 101. The experience content dataset modifier 304 modifies an original experience content dataset into the experience content dataset based on the analytics results for the device 101.

In another embodiment, the analytics retriever 302 accesses analytics results and analytics data from devices having previously generated interactive experiences with the content identifier. The experience content dataset builder 306 may build a new experience content dataset for the experience content dataset based on the analytics results and analytics data for the devices having previously generated interactive experiences with the content identifier. The experience content dataset modifier 304 may modify an original experience content dataset into the experience content dataset based on the analytics results and analytics data for the devices having previously generated interactive experiences with the content identifier.

In one embodiment, the content identifier includes a two-dimensional image or a three-dimensional object model. The virtual object content may include two-dimensional or three-dimensional virtual object model. The experience generator 204 may associate the content identifier with the virtual object content to generate the experience content dataset.

Figure 4:
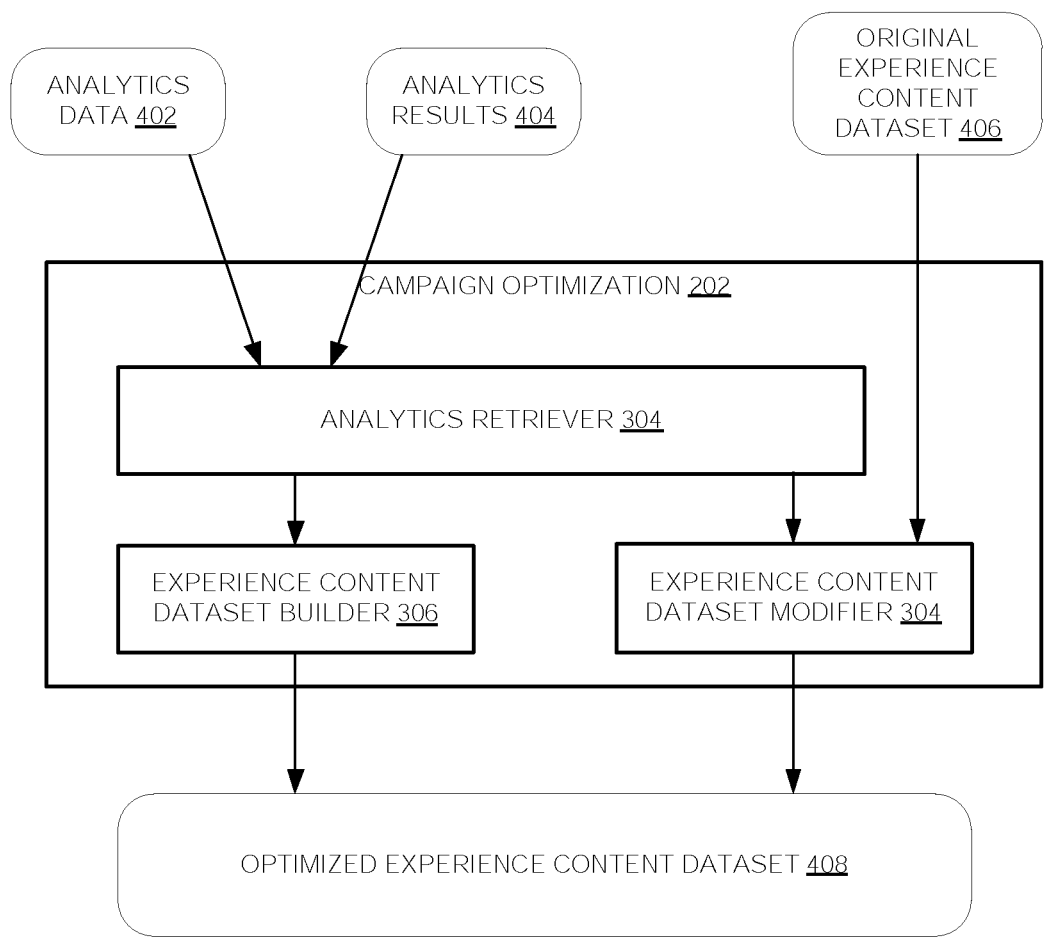
FIG. 4 is a block diagram illustrating an example of an operation of the campaign optimizer, according to some example embodiments.

FIG. 4 is a block diagram illustrating an example of an operation of the campaign optimization module 202, according to some example embodiments. The campaign optimization module 202 receives analytics data 402 and analytics results processed by the analytics computation module 206.

The experience content dataset builder 306 builds an optimized experience content dataset 408 as a new experience content dataset based on the analytics data 402 or analytics results 404 for the device 101 or for other devices. For example, the experience content database builder 306 accesses a three-dimensional virtual content (e.g., a three-dimensional virtual car with animated features) and a two-dimensional virtual content (e.g., a picture) selected based on the analytics data 402 and analytics data 404. The experience content dataset builder 306 associates the physical content model with the virtual content module to generate the optimized experience content dataset 408. The optimized experience content dataset 408 can be communicated to the device 101 so that when the device 101 recognizes a scanned picture from the optimized experience content dataset 408, an experience corresponding to the recognized scanned picture is generated at the device 101. The experience may include enabling the user 102 to interact with specific interactive features or layout of the virtual object pertinent to the user of the device 101. The specific interactive features or layout of the virtual object is presented in combination with a real-time representation of the scanned picture in the display of the device 101.

The experience content dataset modifier 304 modifies an existing original experience content dataset 406 into the optimized experience content dataset based on the analytics data 402 or the analytics results 404 for the device 101 or for other devices. For example, the experience content database modifier 304 accesses a three-dimensional virtual content (e.g., a three-dimensional virtual car with animated features) and a two-dimensional virtual content (e.g., a picture) of the existing original experience content dataset 406. The experience content database modifier 304 modifies a feature or a presentation of the three-dimensional virtual content based on the analytics data 402 and analytics data 404. The experience content dataset modifier 306 associates the physical content model with the modified virtual content module to generate the optimized experience content dataset 408. The optimized experience content dataset 408 can be communicated to the device 101 so that when the device 101 recognizes a scanned picture from the optimized experience content dataset 408, an experience corresponding to the recognized scanned picture is generated at the device 101. The experience may include enabling the user 102 to interact with modified interactive features or layout of the virtual object pertinent to the user of the device 101. The modified interactive features or layout of the virtual object are presented in combination with a real-time representation of the scanned picture in the display of the device 101.

Figure 5:
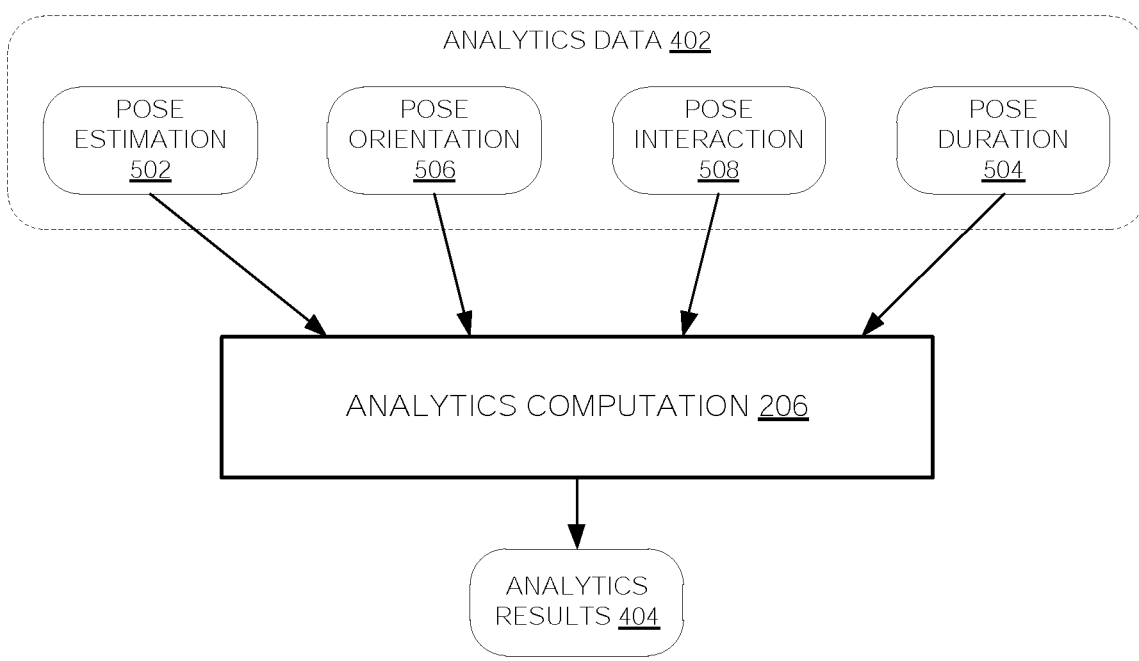
FIG. 5 is a block diagram illustrating an example of an operation of the analytics computation, according to some example embodiments.

FIG. 5 is a block diagram illustrating an example of an operation of the analytics computation module 206, according to some example embodiments. The analytics computation module 206 operates on analytics data 402. In one embodiment, analytics data 402 include pose estimation data 502, pose duration data 508, pose orientation data 506, and pose interaction data 508.

Pose estimation data 502 may include the location on a virtual object or physical object the device 101 is aiming at. For example, the device 101 may aim at the top of a virtual statue generated by aiming the device 101 at the physical object 104. In another example, the device 101 may aim at the shoes of a person in a picture of a magazine.

Pose duration data 504 may include a time duration within which the device 101 is aimed at a same location on the physical or virtual object. For example, pose duration data 504 may include the length of the time the user 102 has aimed and maintained the device at the shoes of a person in the magazine. User sentiment and interest of the shoes may be inferred based on the length of the time the user 102 has held the device 101 aimed at the shoes.

Pose orientation data 506 may be configured to determine an orientation of the device aimed at the physical or virtual object. For example, the pose orientation module 506 may determine that the user 102 is holding the device 101 in a landscape mode and thus may infer a sentiment or interest based on the orientation of the device 101.

Pose interaction data 508 may include data on interactions of the user 102 on the device 101 with respect the virtual object corresponding to the physical object. For example, the virtual object may include features such as virtual menus or button. When the user 102 taps on the virtual button, a browser application in the device 101 is launched to a preselected website associated with the tapped virtual dialog box. Pose interaction data 508 may include data measuring and determining which button the user 102 has tapped on, how often the user 102 has tapped on which button, the click through rate for each virtual buttons, websites visited by the user 102 from an augmented application, and so forth.

The analytics computation module 206 analyzes the data submitted to determine patterns, trends using statistical algorithms. For example, the analytics computation module 206 may determine features most used or clicked on, colors of virtual object clicked on the most or least, areas of the virtual object viewed the most, and so forth. The resulting computation of the analytics computation module 206 may be referred to as analytics results 404.

Figure 6:
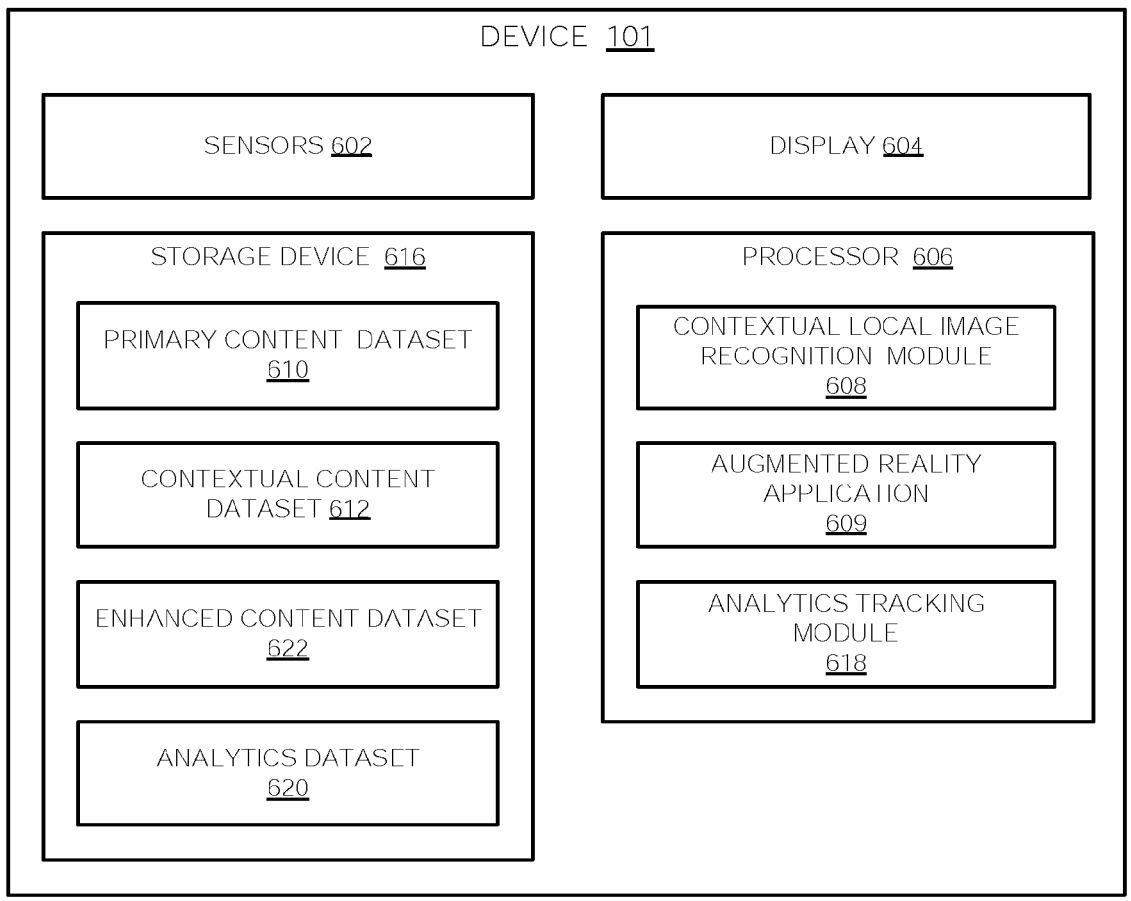
FIG. 6 is a block diagram illustrating modules (e.g., components) of a device, according to some example embodiments.

FIG. 6 is a block diagram illustrating modules (e.g., components) of the device 101, according to some example embodiments. The device 101 may include sensors 602, a display 604, a processor 606, and a storage device 616. For example, the device 101 may be a desktop computer, a vehicle computer, a tablet computer, a navigational device, a portable media device, or a smart phone of a user. The user may be a human user (e.g., a human being), a machine user (e.g., a computer configured by a software program to interact with the device 101), or any suitable combination thereof (e.g., a human assisted by a machine or a machine supervised by a human).

The sensors 602 may include, for example, a proximity sensor, an optical sensor (e.g., charged-coupled device (CCD)), an orientation sensor (e.g., gyroscope), an audio sensor (e.g., a microphone). For example, the sensors 602 may include a rear facing camera and a front facing camera in the device 101. It is noted that the sensors described herein are for illustration purposes and the sensors 602 are thus not limited to the ones described.

The display 604 may include, for example, a touchscreen display configured to receive a user input via a contact on the touchscreen display. In another example, the display 604 may include a screen or monitor configured to display images generated by the processor 606.

The processor 606 may include a contextual local image recognition module 608, a consuming application such as an augmented reality application 609, and an analytics tracking module 618.

The augmented reality application 609 may generate a visualization of a three-dimensional virtual object overlaid on an image of a physical object captured by a camera of the device 101 in the display 604 of the device 101. A visualization of the three-dimensional virtual object may be manipulated by adjusting a position of the physical object relative to the camera of the device 101. Similarly, the visualization of the three-dimensional virtual object may be manipulated by adjusting a position of the device 100 relative to the physical object.

In one embodiment, the augmented reality application 609 communicates with the contextual local image recognition dataset module 608 in the device 101 to retrieve three-dimensional models of virtual objects associated with a captured image. For example, the captured image may include a visual reference (also referred to as a marker) that consists of an identifiable image, symbol, letter, number, machine-readable code. For example, the visual reference may include a bar code, a QR code, or an image that has been previously associated with a three-dimensional virtual object.

In another embodiment, the augmented reality application 609 may allow a user to select an experience from a virtual menu. The experience may include different virtual object content.

The contextual local image recognition dataset module 608 may be configured to determine whether the captured image matches an image locally stored in a local database of images and corresponding additional information (e.g., three-dimensional model and interactive features) on the device 101. In one embodiment, the contextual local image recognition module 608 retrieves a primary content dataset from the server 110, generates and updates a contextual content dataset based an image captured with the device 101.

The analytics tracking module 618 may track analytics data related to how the user 102 is engaged with the physical object. For example, the analytics tracking module 618 may track where on the physical or virtual object the user 102 has looked at, how long the user 102 has looked at each location on the physical or virtual object, how the user 102 held the device 101 when looking at the physical or virtual object, which features of the virtual object the user 102 interacted with (e.g., such as whether a user tapped on a link in the virtual object).

The storage device 616 may be configured to store a database of visual references (e.g., images) and corresponding experiences (e.g., three-dimensional virtual objects, interactive features of the three-dimensional virtual objects). For example, the visual reference may include a machine-readable code or a previously identified image (e.g., a picture of shoe). The previously identified image of the shoe may correspond to a three-dimensional virtual model of the shoe that can be viewed from different angles by manipulating the position of the device 101 relative to the picture of the shoe. Features of the three-dimensional virtual shoe may include selectable icons on the three-dimensional virtual model of the shoe. An icon may be selected or activated by tapping or moving on the device 101.

In one embodiment, the storage device 604 includes a primary content dataset 610, a contextual content dataset 612, an enhanced content dataset 622, and analytics data 620.

The primary content dataset 610 includes, for example, a first set of images and corresponding experiences (e.g., interactive three-dimensional virtual object models). The primary content dataset 610 may include a core set of images or the most popular images determined by the server 110. The core set of images may include a limited number of images identified by the server 110. For example, the core set of images may include the cover image of the ten most popular magazines and the corresponding experiences (e.g., virtual objects). In another example, the server 110 may generate the first set of images based on the most popular or often scanned images received at the server 110.

The contextual content dataset 612 includes, for example, a second set of images and corresponding experiences (e.g., three-dimensional virtual object models) retrieved from the server 110. For example, images captured with the device 101 that are not recognized in the primary content dataset 610 are submitted to the server 110 for recognition. If the captured image is recognized by the server, a corresponding experience may be downloaded at the device 101 and stored in the contextual content dataset 612.

The analytics data 620 corresponds to analytics data collected by the analytics tracking module 618.

The enhanced content dataset 622 includes, for example, an enhanced set of images and corresponding experiences downloaded from the server 110 based on the analytics data collected by the analytics tracking module 618. In one embodiment, the enhanced content dataset 622 may include the optimized experience content dataset 408.

In one embodiment, the device 101 may communicate over the network 108 with the server 110 to retrieve a portion of a database of visual references, corresponding three-dimensional virtual objects, and corresponding interactive features of the three-dimensional virtual objects. The network 108 may be any network that enables communication between or among machines, databases, and devices (e.g., the device 101). Accordingly, the network 108 may be a wired network, a wireless network (e.g., a mobile or cellular network), or any suitable combination thereof. The network may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 7:
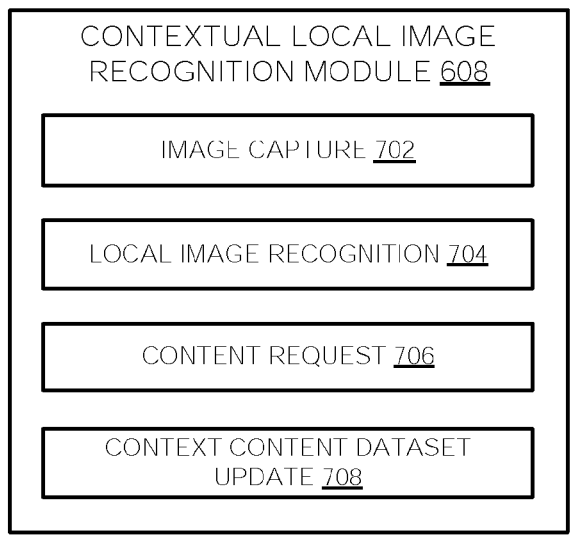
FIG. 7 is a block diagram illustrating modules (e.g., components) of a contextual local image recognition module, according to some example embodiments.

FIG. 7 is a block diagram illustrating modules (e.g., components) of a contextual local image recognition dataset module 608, according to some example embodiments. The contextual local image recognition dataset module 608 may include an image capture module 702, a local image recognition module 704, a content request module 706, and a context content dataset update module 708.

The image capture module 702 may capture an image with a lens of the device 101. For example, the image capture module 702 may capture the image of a physical object pointed at by the device 101. In one embodiment, the image capture module 702 may capture one image or a series of snapshots. In another embodiment, the image capture module 702 may capture an image when sensors 602 (e.g., vibration, gyroscope, compass, etc.) detect that the device 101 is no longer moving.

The local image recognition module 704 determines that the captured image correspond to an image stored in the primary content dataset 610 and locally renders the three-dimensional virtual object model corresponding to the image captured with the device 101 when the image captured with the device 101 correspond to one of the set of images of the primary content dataset 610 stored in the device 101.

In another embodiment, the local image recognition module 704 determines that the captured image correspond to an image stored in the context content dataset 612 and locally renders the three-dimensional virtual object model corresponding to the image captured with the device 101 when the image captured with the device 101 corresponds to one of the set of images of the context content dataset 612 stored in the device 101.

The content request module 706 may request the server 110 for the three-dimensional virtual object model corresponding to the image captured with the device 101 when the image captured with the device 101 does not correspond to one of the set of images in the primary content dataset 612 and the context content dataset 612 in the storage device 604.

The context content dataset update module 708 may receive the three-dimensional virtual object model corresponding to the image captured with the device 101 from the server 110 in response to the request generated by the content request module 706. In one embodiment, the context content dataset update module 708 may update the contextual content dataset 612 with the three-dimensional virtual object model corresponding to the image captured with the device 101 from the server 110 when the image captured with the device 101 does not correspond to any images stored locally in the storage device 604 of the device 101.

In another embodiment, the content request module 706 may determine usage conditions of the device 101 and generate a request to the server 110 for a third set of images and corresponding three-dimensional virtual object models based on the usage conditions. The usage conditions may be related to when, how often, where, and how the user is using the device 101. The context content dataset update module 708 may update the contextual content dataset with the third set of images and corresponding three-dimensional virtual object models.

For example, the content request module 706 determines that the user 102 scans pages of a newspaper in the morning time. The content request module 706 then generates a request to the server 110 for a set of images and corresponding experiences that are relevant to usage of the user 102 in the morning. For example, the content request module 706 may retrieve images of sports articles that the user 102 is most likely to scan in the morning and a corresponding updated virtual score board of the team mentioned in the article. The experience may include, for example, a fantasy league score board update personalized to the user 102.

In another example, the content request module 706 determines that the user 102 often scans the business section of a newspaper. The content request module 706 then generates a request to the server 110 for a set of images and corresponding experiences that are relevant to the user 102. For example, the content request module 706 may retrieve images of business articles of the next issue of the newspaper as soon as the next issue business articles are available. The experience may include, for example, a video report corresponding to an image of the next issue business article.

In yet another embodiment, the content request module 706 may determine social information of the user 102 of the device 101 and generate a request to the server 110 for another set of images and corresponding three-dimensional virtual object models based on the social information. The social information may be obtained from a social network application in the device 101. The social information may relate to who the user 102 has interacted with, who the user 102 has shared experiences using the augmented reality application 609 of the device 101. The context content dataset update module 708 may update the contextual content dataset with the other set of images and corresponding three-dimensional virtual object models.

For example, the user 102 may have scanned several pages of a magazine. The content request module 706 determines from a social network application that the user 102 is friend with another user who share similar interests and read another magazine. As such, the content request module 706 may generate a request to the server 110 for a set of images and corresponding experiences related to the other magazine.

In another example, if the content request module 706 determines that the user 102 has scanned one or two images from the same magazine, the content request module 706 may generate a request for additional content from other images in the same magazine.

Figure 8:
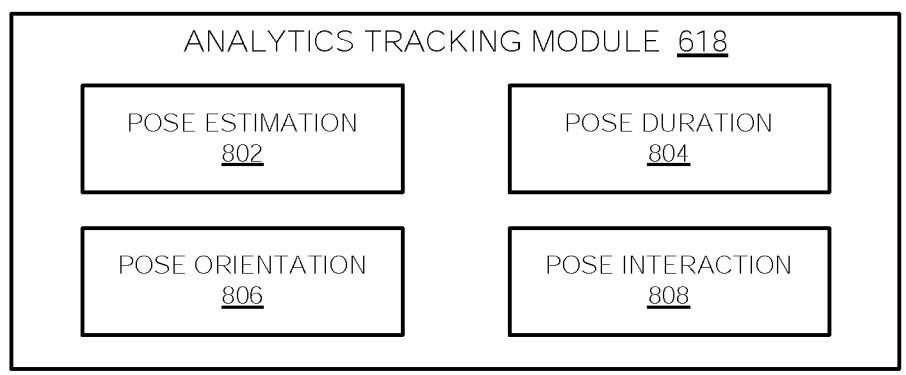
FIG. 8 is a block diagram illustrating modules (e.g., components) of the analytics tracking module, according to some example embodiments

FIG. 8 is a block diagram illustrating modules (e.g., components) of the analytics tracking module 618, according to some example embodiments. The analytics tracking module 618 includes a pose estimation module 802, a pose duration module 804, a pose orientation module 806, and a pose interaction module 808.

The pose estimation module 802 may be configured to detect the location on a virtual object or physical object the device 101 is aiming at. For example, the device 101 may aim at the top of a virtual statue generated by aiming the device 101 at the physical object 104. In another example, the device 101 may aim at the shoes of a person in a picture of a magazine.

The pose duration module 804 may be configured to determine a time duration within which the device 101 is aimed at a same location on the physical or virtual object. For example, the pose duration module 804 may measure the length of the time the user 102 has aimed and maintained the device at the shoes of a person in the magazine. Sentiment and interest of the shoes may be inferred based on the length of the time the user 102 has held the device 101 aimed at the shoes.

The pose orientation module 806 may be configured to determine an orientation of the device aimed at the physical or virtual object. For example, the pose orientation module 806 may determine that the user 102 is holding the device 101 in a landscape mode and thus may infer a sentiment or interest based on the orientation of the device 101.

The pose interaction module 808 may be configured to determine interactions of the user 102 on the device 101 with respect the virtual object corresponding to the physical object. For example, the virtual object may include features such as virtual menus or button. When the user 102 taps on the virtual button, a browser application in the device 101 is launched to a preselected website associated with the tapped virtual dialog box. The pose interaction module 408 may measure and determine which buttons the user 102 has tapped on, the click through rate for each virtual buttons, websites visited by the user 102 from the augmented reality application 609, and so forth.

Figure 9:
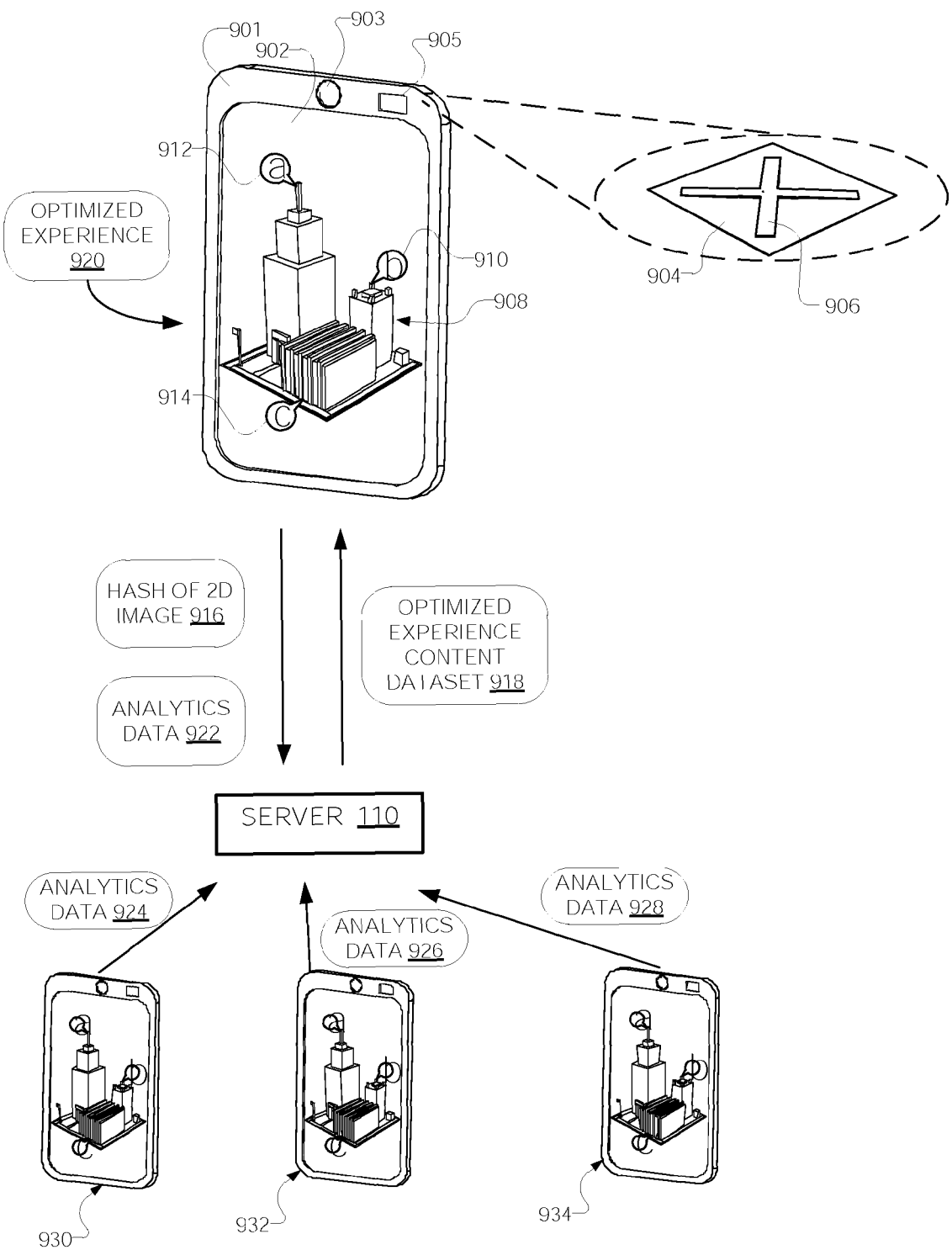
FIG. 9 is a schematic diagram illustrating an example of generating and utilization of an optimization campaign, according to some example embodiments.

FIG. 9 is a schematic diagram illustrating an example of consuming an experience, according to some example embodiments. The device 901 may be pointed at a physical object 904 having an image 906 that is recognized by the device 901. The device 901 submits a hash of the image 916 along with analytics data 922 of the device 901 to the server 110. The server 110 also receives data analytics 924, 926, and 928 from other devices 930, 932, and 934 having previously pointed to the same image 906. In another embodiment, data analytics 924, 926, and 928 include data from devices 930, 932, and 934 having previously pointed to the other images or objects.

The campaign optimization module 202 at the server 110 generates an optimized experience content dataset 918 customized for the device 901. The device 901 generates a representation of a virtual object 908 in a display 902 of the device 901. The optimized experience 920 may include, for example, the virtual object 908 with personalized points of interest 910, 912, and 914 particularly relevant to the user of the device 901. For example, the optimized experience content dataset 918 might include a virtual object or a sound favored by the user.

In another embodiment, the campaign optimization module 202 at the server 110 generates an optimized experience content dataset 918 based on the aggregate analytics data 916, 924, 926, and 928. The device 901 generates a representation of the virtual object 908 in the display 902 of the device 901. The optimized experience 920 may include, for example, the virtual object 908 with the most popular points of interest 910, 912, and 914 as determined from an analysis of the aggregate analytics data 924, 926, and 928.

In another embodiment, the optimized experience 920 may include, for example, most looked at interactive features with points of interests 912, 910, 914 of the three-dimensional virtual object 908. In one embodiment, a rendering engine at the device renders the three-dimensional virtual object 908.

Figure 10:
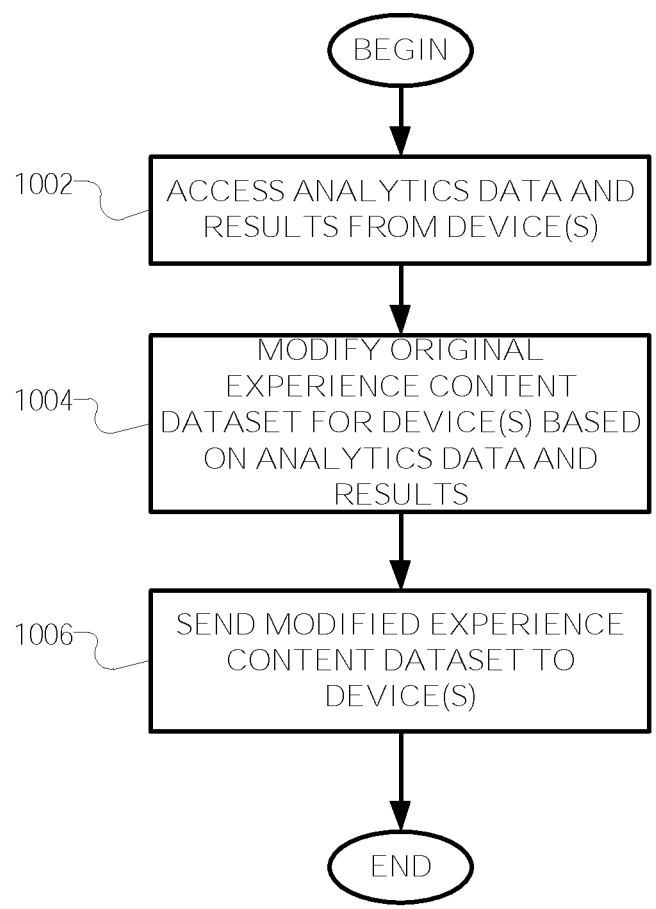
FIG. 10 is a flowchart illustrating an example method for optimizing a campaign, according to some example embodiments.

FIG. 10 is a flowchart illustrating an example method for optimizing a campaign, according to some example embodiments.

At operation 1002, a campaign optimization module of a server accesses analytics data and results from device(s).

At operation 1004, the campaign optimization module modifies an original experience content dataset for device(s) based on analytics data and results from the device(s).

At operation 1006, the campaign optimization module sends the modified experience content dataset to the device(s).

Figure 11:
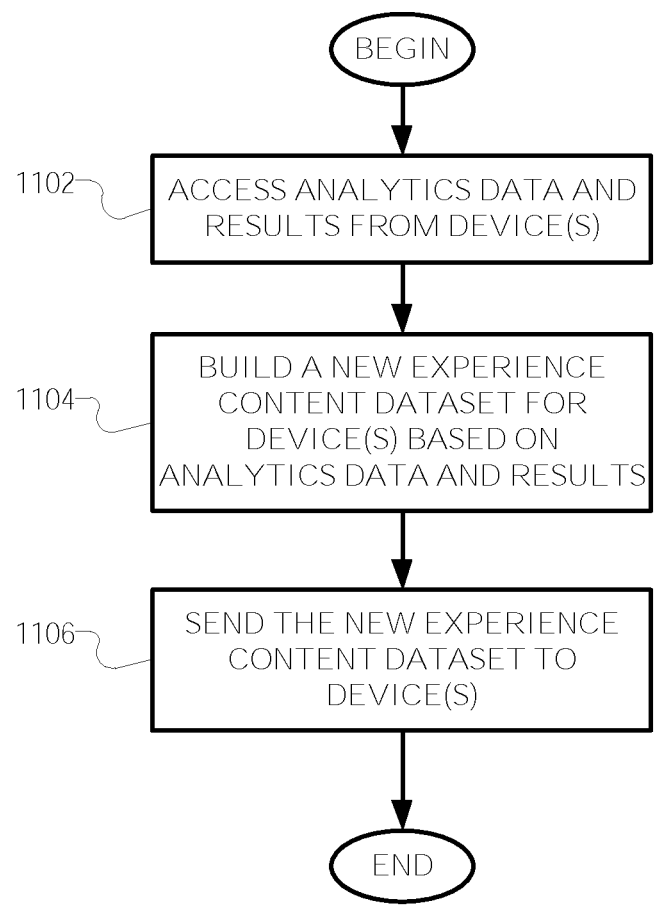
FIG. 11 is a flowchart illustrating another example method for optimizing a campaign, according to some example embodiments.

FIG. 11 is a flowchart illustrating another example method for optimizing a campaign, according to some example embodiments.

At operation 1102, a campaign optimization module of a server accesses analytics data and results from device(s).

At operation 1104, the campaign optimization module builds a new experience content dataset for device(s) based on analytics data and results from the device(s).

At operation 1106, the campaign optimization module sends the modified experience content dataset to the device(s).

Figure 12:
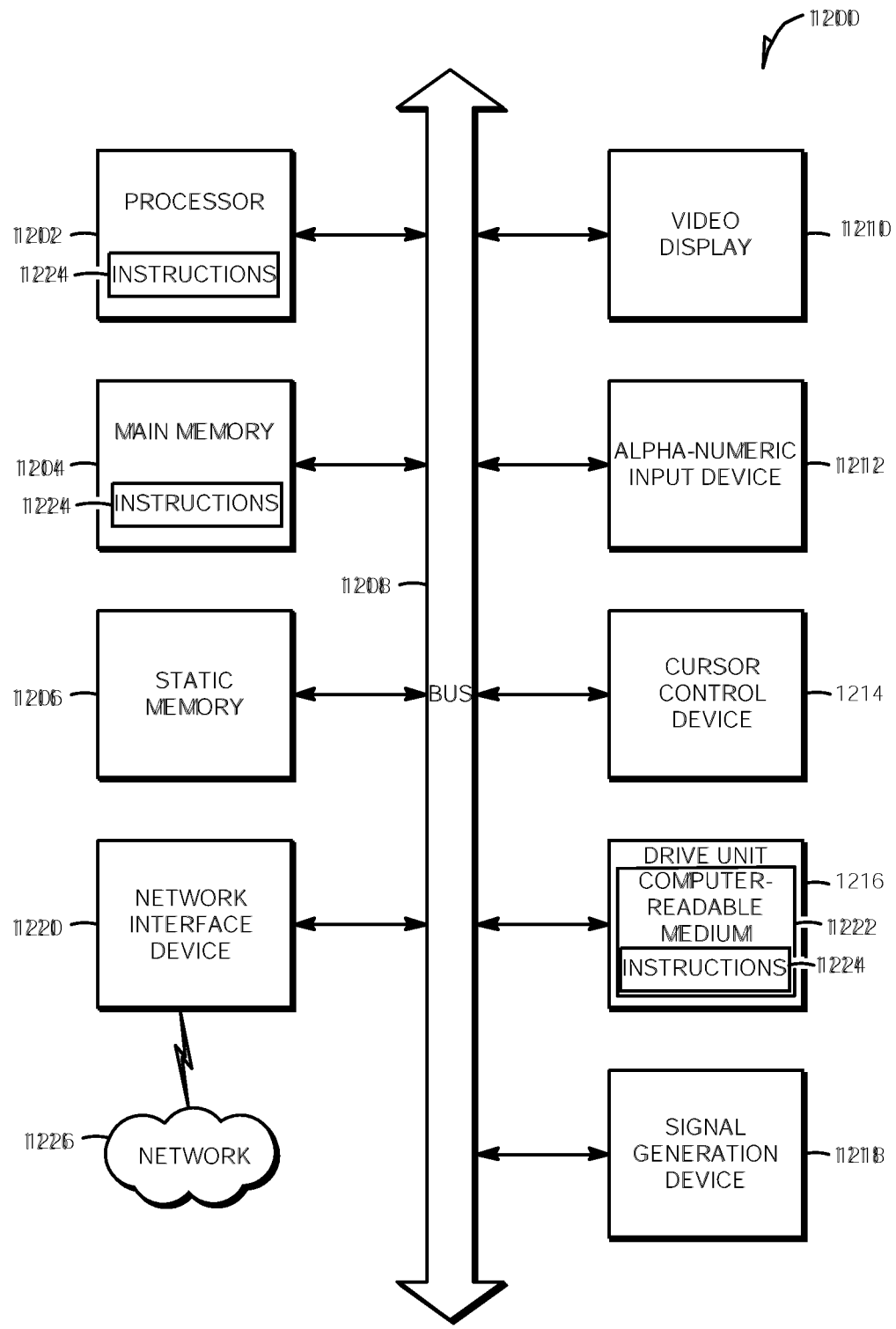
FIG. 12 is a block diagram illustrating components of a machine, according to some example embodiments, able to read instructions from a machine-readable medium and perform any one or more of the methodologies discussed herein.

FIG. 12 is a block diagram illustrating components of a machine 1200, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 12 shows a diagrammatic representation of the machine 1200 in the example form of a computer system and within which instructions 1224 (e.g., software, a program, an application, an applet, an app, or other executable code) for causing the machine 1200 to perform any one or more of the methodologies discussed herein may be executed, in whole or in part. In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a distributed (e.g., peer-to-peer) network environment. The machine 1200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include a collection of machines that individually or jointly execute the instructions 1224 to perform all or part of any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The machine 1200 may further include a graphics display 1210 (e.g., a plasma display panel (PDP), a light emitting diode (LED) display, a liquid crystal display (LCD), a projector, or a cathode ray tube (CRT)). The machine 1200 may also include an alphanumeric input device 1212 (e.g., a keyboard), a cursor control device 1214 (e.g., a mouse, a touchpad, a trackball, a joystick, a motion sensor, or other pointing instrument), a storage unit 1216, a signal generation device 1218 (e.g., a speaker), and a network interface device 1220.

The storage unit 1216 includes a machine-readable medium 1222 on which is stored the instructions 1224 embodying any one or more of the methodologies or functions described herein. The instructions 1224 may also reside, completely or at least partially, within the main memory 1204, within the processor 1202 (e.g., within the processor's cache memory), or both, during execution thereof by the machine 1200. Accordingly, the main memory 1204 and the processor 1202 may be considered as machine-readable media. The instructions 1224 may be transmitted or received over a network 1226 (e.g., network 108) via the network interface device 1220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1200), such that the instructions, when executed by one or more processors of the machine (e.g., processor 1202), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A server comprising:
one or more hardware processors of the server comprising a campaign optimization module, an analytics computation module, and an experience generator,
the campaign optimization module configured to generate a second experience content dataset for an augmented reality application of a device based on analytics results of other users interactions on other devices that include a first experience content dataset, the second experience content dataset comprising a second virtual object and a second set of user interactive features of the second virtual object;
the analytics computation module configured to generate the analytics results based on analytics data received from the other devices, the analytics data based on the other users interactions with a first virtual object displayed on the other devices and a first set of user interactive features of the first virtual object from the first experience dataset;
the experience generator configured to provide the second experience content dataset to the device, the device configured to recognize a physical content identifier from the second experience content dataset, to identify the physical content identifier in an image captured with a camera of the device, and to display in the device the second virtual object and the second set of user interactive features of the second virtual object in response to identifying the physical content identifier in the image, and
a storage device configured to store the augmented reality application and the first and second experience content datasets.

2. The server of claim 1, wherein the campaign optimization module comprises:
an analytics retriever configured to access analytics results from the device;

an experience content dataset builder configured to build a third experience content dataset to replace the first experience content dataset based on the analytics results from the device and from the other devices; and an experience content dataset modifier configured to modify the first experience content dataset based on the analytics results from the device and from the other devices.

3. The server of claim 1, wherein the campaign optimization module comprises:

an analytics retriever configured to access analytics results and analytics data from the other devices, the other devices having previously displayed the first virtual object and the first set of user interactive features of the first virtual object from the first experience dataset;

an experience content dataset builder configured to build the second experience content dataset to replace the first experience content dataset based on the analytics results and analytics data from the other devices; and an experience content dataset modifier configured to modify the first experience content dataset based on the analytics results and analytics data from the other devices.

4. The server of claim 1, wherein the experience generator is configured to generate a first virtual object model using the first experience content dataset, the first virtual object model to be rendered in a display of the device based on a position of the device relative to a physical object recognized as the physical content identifier, and a presentation of the first virtual object being based on a real-time image of the physical object captured with the device, the first virtual object model associated with an image of the physical object.

5. The server of claim 1, wherein the analytics computation module is configured to receive pose estimation data of the device relative to the physical object captured with the device, pose duration data of the device relative to the physical object captured with the device, pose orientation data of the device relative to the physical object captured with the device, and pose interaction data of the device relative to the physical object captured with the device, wherein the pose estimation data comprises a location on the physical or first virtual object aimed by the device, wherein the pose duration data comprises a time duration within which the device is aimed at a same location on the physical or first virtual object, wherein the pose orientation data comprises an orientation of the device aimed at the physical or first virtual object, and wherein the pose interaction data comprises interactions of the user on the device with the first virtual object corresponding to the physical object.

6. The server of claim 1, wherein the physical content identifier identifies a two-dimensional physical object or a three-dimensional physical object, wherein the first virtual object comprises a two-dimensional or three-dimensional virtual object model, and wherein the experience generator is configured to associate the physical content identifier with the first virtual object to generate the first experience content dataset.

7. The server of claim 6, wherein the two-dimensional or three-dimensional virtual object model has at least one user interactive feature, the at least one user interactive feature changing a state of the two-dimensional or three-dimensional virtual object model in response to an interaction from a user on the device.

8. The server of claim 6, wherein the campaign optimization module is configured to change a user interactive feature of the first virtual object from the first experience content dataset based on the analytics results of the other user interactions on the other devices.

9. The server of claim 1, wherein the analytics data comprises usage conditions of the device.

10. The server of claim 9, wherein the usage conditions of the device comprises social information of a user of the device, location usage information, and time information of the device using the augmented reality application.

11. A computer-implemented method comprising:

generating a second experience content dataset for an augmented reality application of a device based on analytics results of other users interactions on other devices that include a first experience content dataset, the second experience content dataset comprising a second virtual object and a second set of user interactive features of the second virtual object;

generating, using at least one hardware processor of a server, the analytics results based on analytics data received from the other devices, the analytics data based on the other users interactions with a first virtual object displayed on the other devices and a first set of user interactive features of the first virtual object from the first experience dataset;

providing the second experience content dataset to the device, the device configured to recognize a physical content identifier from the second experience content dataset, to identify the physical content identifier in an image captured with a camera of the device, and to display in the device the second virtual object and the second set of user interactive features of the second virtual object in response to identifying the physical content identifier in the image.

12. The computer-implemented method of claim 11, further comprising:

accessing the analytics results from the device;

building a third experience content dataset to replace the first experience content dataset based on the analytics results from the device and from the other devices; and modifying the first experience content dataset based on the analytics results from the device and from the other devices.

13. The computer-implemented method of claim 11, further comprising:

accessing analytics results and analytics data from other devices, the other devices having previously displayed the first virtual object and the first set of user interactive features of the first virtual object from the first experience content dataset;

building the second experience content dataset to replace the first experience content dataset based on the analytics results and analytics data from the other devices; and modifying the first experience content dataset based on the analytics results and analytics data from the other devices.

14. The computer-implemented method of claim 11, further comprising:

generating a first virtual object model using the first experience content dataset, the first virtual object model to be rendered in a display of the device based on a position of the device relative to a physical object recognized as the physical content identifier, a presentation of the first virtual object being based on a real-time image of the physical object captured with the device, the first virtual object model associated with an image of the physical object.

15. The computer-implemented method of claim 11, further comprising:
receiving pose estimation data of the device relative to the physical object captured with the device, pose duration data of the device relative to the physical object captured with the device, pose orientation data of the device relative to the physical object captured with the device, and pose interaction data of the device relative to the physical object captured with the device,
wherein the pose estimation data comprises a location on the physical or first virtual object aimed by the device,
wherein the pose duration data comprises a time duration within which the device is aimed at a same location on the physical or first virtual object,
wherein the pose orientation data comprises an orientation of the device aimed at the physical or first virtual object, and
wherein the pose interaction data comprises interactions of the user on the device with the first virtual object corresponding to the physical object.

16. The computer-implemented method of claim 11, wherein the physical content identifier identifies a two-dimensional physical object or a three-dimensional physical object,
wherein the first virtual object comprises a two-dimensional or three-dimensional virtual object model, and further comprising:
associating the physical content identifier with the first virtual object to generate the first experience content dataset.

17. The computer-implemented method of claim 16, wherein the two-dimensional or three-dimensional virtual object model has at least one user interactive feature, the at least one user interactive feature changing a state of the two-dimensional or three-dimensional virtual object model in response to an interaction from a user on the device.

18. The computer-implemented method of claim 16, further comprising:
changing a user interactive feature of the first virtual object from the first experience content dataset based on the analytics results of the other user interactions on the other devices.

19. The computer-implemented method of claim 11, wherein the analytics data comprises usage conditions of the device, the usage conditions of the device comprising social information of a user of the device, location usage information, and time information of the device using the augmented reality application.

20. A non-transitory machine-readable medium comprising instructions that, when executed by one or more processors of a machine, cause the machine to perform operations comprising:
generating a second experience content dataset for an augmented reality application of a device based on analytics results of users interactions on other devices that include a first experience content dataset, the second experience content dataset comprising a second virtual object and a second set of user interactive features of the second virtual object;
generating the analytics results based on analytics data received from the other devices, the analytics data based on the other users interactions with a first virtual object displayed on the other devices and a first set of user interactive features of the first virtual object from the first experience dataset;
providing the second experience content dataset to the device, the device configured to recognize a physical content identifier from the second experience content dataset, to identify the physical content identifier in an image captured with a camera of the device, and to display in the device the second virtual object and the second set of user interactive features of the second virtual object in response to identifying the physical content identifier in the image.

* * * * *